(12) United States Patent
Guo et al.

(10) Patent No.: US 12,044,584 B2
(45) Date of Patent: Jul. 23, 2024

(54) HIGH-SENSITIVITY FLEXIBLE THREE-DIMENSIONAL FORCE TACTILE SENSOR AND PREPARATION METHOD THEREOF

(71) Applicant: ANHUI UNIVERSITY, Anhui (CN)

(72) Inventors: Xiaohui Guo, Anhui (CN); Zhiliang Chen, Anhui (CN); Pengbin Gui, Anhui (CN); Siliang Wang, Anhui (CN); Wei Zeng, Anhui (CN); Xingang Ren, Anhui (CN); Lixia Yang, Anhui (CN); Yaohua Xu, Anhui (CN); Zhixiang Haung, Anhui (CN)

(73) Assignee: ANHUI UNIVERSITY, Anhui (CN)

( * ) Notice: Subject to any disclaimer, the term of this patent is extended or adjusted under 35 U.S.C. 154(b) by 339 days.

(21) Appl. No.: 17/771,818

(22) PCT Filed: Dec. 31, 2021

(86) PCT No.: PCT/CN2021/143957
§ 371 (c)(1),
(2) Date: Apr. 26, 2022

(87) PCT Pub. No.: WO2022/179313
PCT Pub. Date: Sep. 1, 2022

(65) Prior Publication Data
US 2023/0160761 A1 May 25, 2023

(30) Foreign Application Priority Data
Feb. 25, 2021 (CN) .......................... 202110210714.5

(51) Int. Cl.
*G01L 1/14* (2006.01)
(52) U.S. Cl.
CPC .................................. *G01L 1/144* (2013.01)

(58) Field of Classification Search
CPC ......... G01L 1/144; G01L 5/165; G01L 1/142; G01L 1/26
See application file for complete search history.

(56) References Cited

U.S. PATENT DOCUMENTS

| 4,852,443 A * | 8/1989 | Duncan | G10H 3/146 84/DIG. 12 |
| 9,645,028 B2 * | 5/2017 | Choong | G01L 1/2206 |

(Continued)

FOREIGN PATENT DOCUMENTS

| CN | 106959175 | 7/2017 |
| CN | 108204869 | 6/2018 |

(Continued)

OTHER PUBLICATIONS

"International Search Report (Form PCT/ISA/210) of PCT/CN2021/143957," mailed on Apr. 6, 2022, pp. 1-5.

*Primary Examiner* — Freddie Kirkland, III
(74) *Attorney, Agent, or Firm* — JCIPRNET

(57) ABSTRACT

A high sensitivity flexible three-dimensional force tactile sensor includes a hemispherical contact, wherein the hemispherical contact includes a tray with a groove on the surface and a hemispherical protrusion arranged in the groove. A flexible inverted cone component connected to the lower surface of the hemispherical contact, wherein a plurality of flexible triangular excitation electrode is arranged on the side surface of the flexible inverted cone component. A flexible common electrode surrounding part of the flexible triangular excitation electrode, wherein a first cavity with an opening is opened inside the flexible common electrode, parts of the flexible triangular excitation electrode and the flexible inverted cone component are arranged in the first cavity of the flexible common electrode. The flexible triangular excitation electrode and the flexible inverted cone (Continued)

component have no contact with the inner wall of the first cavity of the flexible common electrode to form an air cavity.

10 Claims, 4 Drawing Sheets

(56) References Cited

U.S. PATENT DOCUMENTS

| | | | |
|---|---|---|---|
| 10,037,098 B2 * | 7/2018 | Bao | G06F 3/04144 |
| 11,137,297 B2 * | 10/2021 | Sawada | G01L 1/146 |
| 11,892,378 B2 * | 2/2024 | Conde | G01L 1/142 |

FOREIGN PATENT DOCUMENTS

| | | |
|---|---|---|
| CN | 110793701 | 2/2020 |
| CN | 111366274 | 7/2020 |
| CN | 111537115 | 8/2020 |
| CN | 111609953 | 9/2020 |
| CN | 113218542 | 8/2021 |
| WO | 2017215086 | 12/2017 |
| WO | 2018067626 | 4/2018 |

* cited by examiner

HIGH-SENSITIVITY FLEXIBLE THREE-DIMENSIONAL FORCE TACTILE SENSOR AND PREPARATION METHOD THEREOF

CROSS-REFERENCE TO RELATED APPLICATION

This application is a 371 of international application of PCT application serial no. PCT/CN2021/143957, filed on Dec. 31, 2021, which claims the priority benefit of China application no. 202110210714.5, filed on Feb. 25, 2021. The entirety of each of the above mentioned patent applications is hereby incorporated by reference herein and made a part of this specification.

TECHNICAL FIELD

The application relates to the field of three-dimensional force tactile sensors, and in particular to a high-sensitivity flexible three-dimensional force tactile sensor and preparation method thereof.

BACKGROUND ART

At present, the degree of intelligence and refinement of robot operations continues to increase, and the requirements for robot production are becoming more and more stringent. Scholars at home and abroad have taken faster response, higher sensitivity, wider detection range, and better durability as the research direction of flexible three-dimensional force flexible tactile sensors.

There have been certain researches on flexible three-dimensional force tactile sensors at home and abroad, but most of them are about the improvement of sensor preparation materials. The basic working principle of the sensor is mainly concentrated in the three directions of capacitive, piezoresistive and photoelectric. The principle is relatively simple, but it is still difficult to design a novel structure.

The research of flexible three-dimensional force tactile sensor includes flexible sensor technology, flexible material preparation and molding technology, durability research, etc. The key issues are mainly reflected in the following aspects: (1) The measurement accuracy of the flexible three-dimensional force tactile sensor is not high, and the measurement range is small. (2) The measurement response speed of the flexible three-dimensional force tactile sensor is slow. (3) The flexible three-dimensional force tactile sensor is easy to wear and difficult to repair.

Therefore, using composite conductive materials and high-durability flexible materials, diverging innovative thinking to design new and reliable structures, thereby improving the excellent performance of the sensor, will be the mainstream of the development of flexible three-dimensional force tactile sensors.

SUMMARY OF THE APPLICATION

The purpose of the application is to provide a high-sensitivity flexible three-dimensional force tactile sensor and a preparation method thereof.

In order to achieve the above purpose, the application provides the following technical solutions:

A high-sensitivity flexible three-dimensional force tactile sensor, includes:

a hemispherical contact, wherein the hemispherical contact includes a tray with a groove on the surface and a hemispherical protrusion arranged in the groove, the joint between the groove and the upper surface of the tray is U-shaped, V-shaped, W-shaped or horizontal "S"-shaped;

a flexible inverted cone component connected to the lower surface of the hemispherical contact, wherein a plurality of flexible triangular excitation electrodes are arranged on the side surfaces of the flexible inverted cone component, the flexible inverted cone component is a circular cone or a polygonal pyramid with a multiple of four faces; and a flexible common electrode surrounding part of the flexible triangular excitation electrodes, wherein a first cavity with an opening is opened inside the flexible common electrode, the shape of the first cavity is consistent with the shape of the flexible inverted cone component, the flexible triangular excitation electrodes and a part of the flexible inverted cone component are arranged in the first cavity of the flexible common electrode, and each of the flexible triangular excitation electrodes and the flexible inverted cone component have no contact with the inner wall of the first cavity of the flexible common electrode to form an air cavity.

Wherein, it also includes a flexible substrate connected to the outer surface of the flexible common electrode for supporting the flexible common electrode and the hemispherical contact.

Wherein, a second cavity with an opening is opened inside the flexible substrate. The shape of the second cavity is consistent with the shape of the flexible common electrode. The flexible common electrode is arranged on the inner wall of the second cavity of the flexible substrate. The outer edge of the top surface of the second cavity of the flexible substrate and the outer edge of the bottom surface of the tray are bonded by silicone rubber bonding.

Wherein, the flexible substrate is a rectangular parallelepiped, and the length and width of the flexible substrate are consistent with the length and width of the tray.

Wherein, the height of the flexible common electrode is smaller than the height of the second cavity of the flexible substrate. The flexible common electrode is connected with a wire, which connected to the ground and used as a common electrode. Each side surface of the flexible common electrode is bonded to each inner side surface of the second cavity of the flexible substrate by using silicone rubber as an adhesive.

Wherein, the size of the flexible inverted cone component is smaller than the size of the first cavity of the flexible common electrode, and the flexible inverted cone component is bonded to the center of the tray on the side where the hemispherical protrusion is not provided by silicone rubber.

Wherein, the number of the flexible triangular excitation electrodes is 4N, and N is a positive integer. When the flexible inverted cone component is a circular cone, the flexible triangular excitation electrode has a curved fan shape and is attached to the outer surface of the flexible inverted cone component. When the flexible inverted cone component is a multi-faceted pyramid, the flexible triangle excitation electrode is a triangle. Each side of the flexible inverted cone component of the polyhedral pyramid is provided with one flexible triangular excitation electrode, the outer surface of the flexible triangular excitation electrode is provided with a silicone rubber layer, and each of the flexible triangular excitation electrodes is connected with a wire used as an excitation terminal.

wherein, the materials used for the hemispherical contacts, the flexible substrate, and the flexible inverted cone component are silicone rubber or polydimethylsiloxane. The materials used for the flexible common electrode and the flexible triangular excitation electrode are silicone conductive silver glue, conductive polymer, or conductive composite material.

Wherein, the shapes of the flexible inverted cone component and the flexible common electrode are inverted quadrangular pyramid.

A method for preparing a high-sensitivity flexible three-dimensional force tactile sensor includes the following steps:

using 3D printing technology to print out a flexible substrate mold, a flexible inverted cone component mold, a flexible common electrode mold and a hemispherical contact mold;

injecting silicone rubber material or polydimethylsiloxane (PDMS) into the flexible substrate mold, the flexible inverted cone component mold, and the hemispherical contact mold, injecting organic silicon conductive silver glue (YC-02), conductive polymer, or conductive composite material into the flexible common electrode mold, releasing from the molds after cured, and a flexible substrate, a hemispherical contact, a flexible inverted cone component and a flexible common electrode prepared;

spreading organic silicon conductive silver glue, conductive polymer, or conductive composite material evenly on the center of the side surface of the made flexible inverted cone component, a plurality of flexible triangle excitation electrodes formed after standing and curing, and spreading silicone rubber on the surface of the flexible triangle excitation electrode; and using silicone rubber as an adhesive to assemble the obtained parts.

The beneficial effects of this application include:

The application uses a flexible triangular excitation electrode and a flexible common electrode to form four spatially distributed capacitors. When the normal force and tangential force act on the hemispherical contact, the distance between the plates and the effective facing area will be changed at the same time, thereby realize the change of the capacitance value. Through the change of the four capacitance values symmetrically distributed, the magnitude and direction of the external force can be more sensitively sensed.

The hemispherical contact structure in the present application makes it more sensitive when subjected to force. The hemispherical protrusion can drive the flexible inverted quadrangular pyramid component to deform when subjected to a small force. Cooperating with the groove design on the tray, the joint between the groove and the upper surface of the tray is U-shaped, V-shaped, W-shaped or a horizontal "S" design, which makes the hemispherical protrusion easier to be pushed and deformed when detecting tangential force. This makes the present application more sensitive when detecting the tangential force, and can obtain a larger displacement, that is, the change in the distance between the plates is larger, and the change in the capacitance value is made more obvious.

The design of the inverted quadrangular pyramid structure and the inverted quadrangular pyramid cavity of the flexible common electrode increases the air cavity. Because the air resistance is small, under the same force, compared with solid filling, the structure can obtain a larger amount of deformation, which is helpful to improve the sensitivity.

Compared with the design of the traditional rectangular excitation electrode, the flexible triangular excitation electrode has a triangular or fan-shaped structure. Due to the semi-enclosed design of the flexible triangular excitation electrode and the flexible common electrode, it is possible to change the facing area of the electrode plate under the action of the normal force. And according to the shape of the flexible inverted cone component, the flexible triangle excitation electrode is placed obliquely, so that when the normal force is applied, not only the facing area can be changed, but the distance between the plates can also be changed, and the capacitance change is more obvious.

In the inverted quadrangular pyramid cavity formed by the flexible substrate, the flexible common electrode and the flexible triangular excitation electrode form four spatially distributed capacitors.

This application is based on the "inverted quadrangular pyramid" structure. With the hemispherical contact, the flexible common electrode and the flexible triangular excitation electrodes to form four spatially distributed capacitors. Compared with the traditional capacitive three-dimensional force structure, under the same normal force, the "inverted quadrangular pyramid" structure can change the distance between the plates and the effective facing area at the same time, and has excellent characteristics such as high sensitivity and fast response.

In addition, compared with the traditional rigid three-dimensional force sensor, this application has a wider range of applications, including but not limited to applications in related fields such as intelligent robot electronic skin and medical equipment. The present application has a clear structure and is convenient to assemble. Compared with other complex three-dimensional force sensors, the present application has better durability and is easy to maintain.

Wherein: 1—hemispherical contact, 11—hemispherical protrusion, 12—tray, 13—groove, 131—joint, 2—flexible inverted cone component, 3—flexible triangular excitation electrode, 4—flexible common electrode, 5—flexible substrate, 40—first cavity, 50—second cavity.

DETAILED DESCRIPTION OF THE EMBODIMENTS

In order to make the technical solutions and advantages of the embodiments of the present application clearer, the following will describe the technical solutions in the embodiments of the present application more clearly and completely with reference to the drawings in the embodiments of the present application. Obviously, the described embodiments are a part of the embodiments of the present application, rather than all the embodiments. Based on the embodiments of the present application, all other embodiments obtained by a person of ordinary skill in the art without creative work shall fall within the protection scope of the present application.

Figure 1:
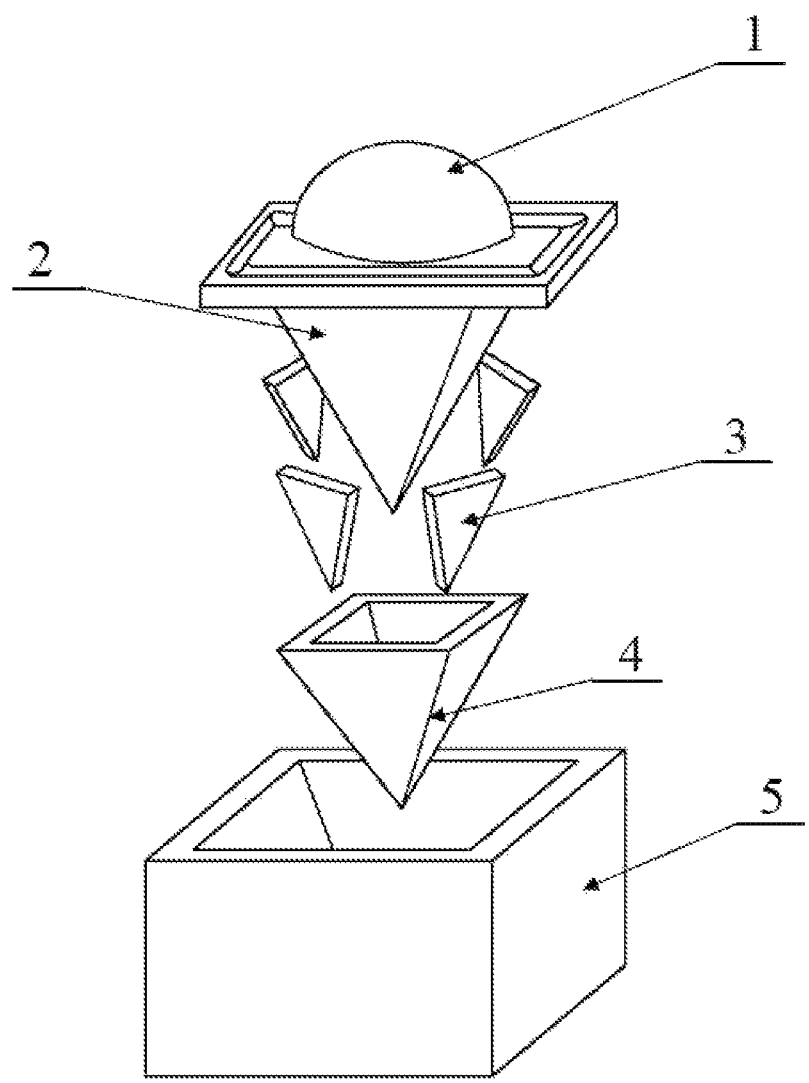
FIG. 1 is an exploded view of the structure of the application.
Figure 2:
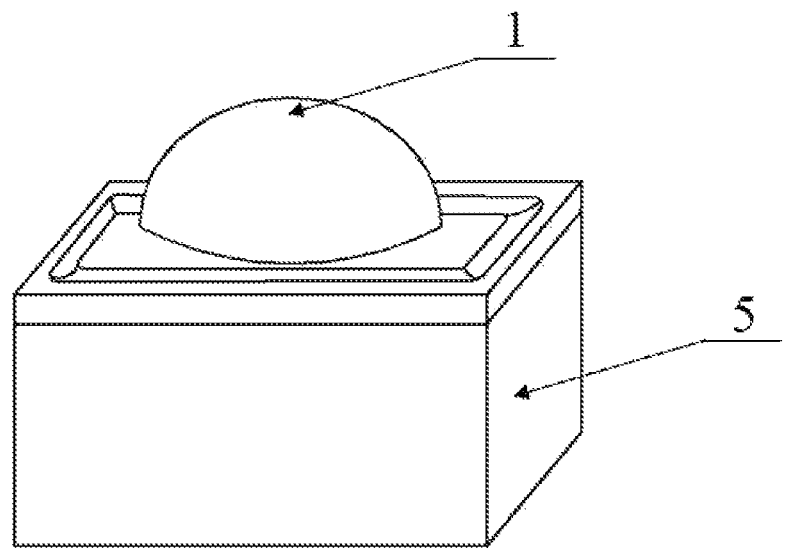
FIG. 2 is a schematic view of the overall structure of the application.

Please refer to FIGS. 1 and 2, in the embodiment of this application, a high-sensitivity flexible three-dimensional force tactile sensor, includes:

a hemispherical contact 1, wherein the hemispherical 1 contact includes a tray 12 with a groove 13 on the surface and a hemispherical protrusion 11 arranged in the groove 13, the joint 131 between the groove 13 and the upper surface of the tray 12 is U-shaped, V-shaped, W-shaped or horizontal "S"-shaped;

a flexible inverted cone component 2 connected to the lower surface of the hemispherical contact, wherein a plurality of flexible triangular excitation electrodes 3 are arranged on the side surface of the flexible inverted cone component, the flexible inverted cone component 2 is a circular cone or a polygonal pyramid with a multiple of four faces; and a flexible common electrode 4 surrounding part of the flexible triangular excitation electrodes 3, wherein a first cavity 40 with an opening is opened inside the flexible common electrode 4, the shape of the first cavity 40 is consistent with the shape of the flexible inverted cone component 2, the flexible triangular excitation electrodes 3 and a part of the flexible inverted cone component 2 are arranged in the first cavity 40 of the flexible common electrode 4, and the flexible triangular excitation electrodes 3 and the flexible inverted cone component 2 have no contact with the inner wall of the first cavity 40 of the flexible common electrode 4 to form an air cavity.

Figure 3:
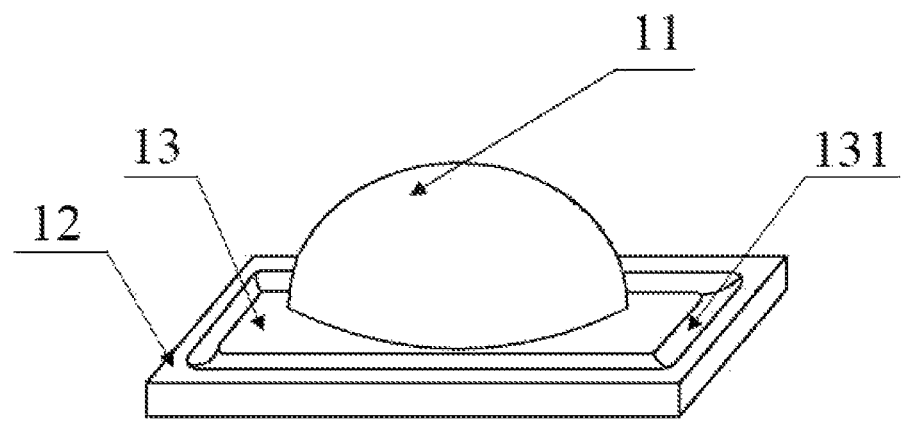
FIG. 3 is a schematic view of the structure of the hemispherical contact.

Referring to FIG. 3, the hemispherical contact 1 includes a tray 12 capable of covering the opening of a flexible substrate cavity, and a hemispherical protrusion 11 provided on the tray. The hemispherical protrusion 11 is solid. The upper surface of the tray 12 is provided with a groove 13 which is a rectangular groove. The joint between the groove and the upper surface of the tray is U-shaped, V-shaped, W-shaped or horizontal "S"-shaped, preferably U-shaped. The hemispherical protrusion 11 is arranged in the groove 13 of the tray 12. The configuration of the joint 131 makes the hemispherical protrusion 11 located in the groove 13 easier to be pushed to deform when detecting the tangential force. This makes the present application more sensitive when detecting the tangential force, and can obtain a larger displacement, that is, the change in the distance between the plates is larger, and the change in the capacitance value is made more obvious. The outer edge of the side of the tray 12 without the hemispherical protrusion 11 is bonded and fixed to the outer edge of the top surface of the second cavity of the flexible substrate 5 through silicone rubber. The hemispherical contact 1 is made of flexible insulating material, preferably silicone rubber. The structure of the hemispherical contact 1 makes it more sensitive to force. When the hemispherical protrusion is subjected to a slight force, it can drive the inverted quadrangular pyramid component 2 to deform, thereby causing a large change in the distance between the plates, making the capacitance value more obvious.

Figure 4:
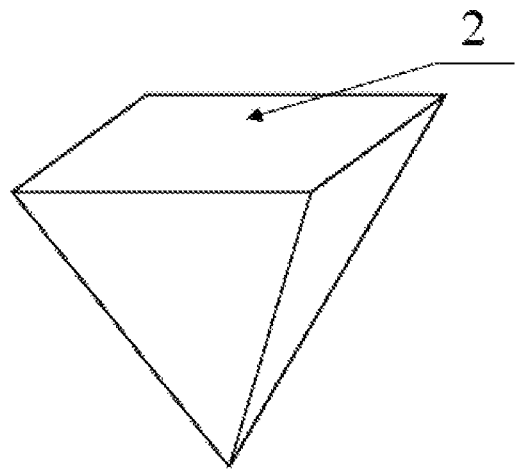
FIG. 4 is a schematic view of the structure of the flexible inverted cone component.
Figure 5:
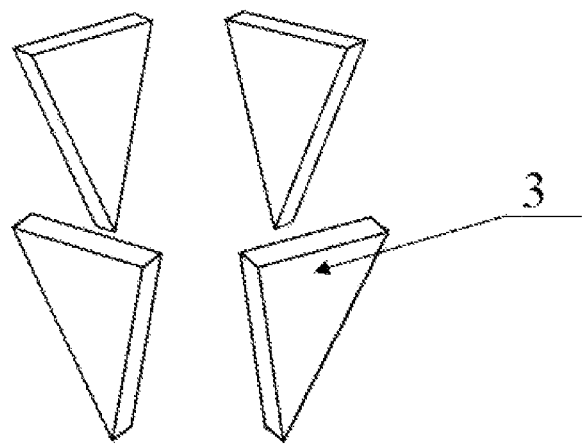
FIG. 5 is a schematic view of the structure of the flexible triangle excitation electrode.

Referring to FIGS. 4 and 5, the height of the flexible inverted cone component 2 is smaller than the size of the first cavity of the flexible common electrode 4, and the flexible inverted cone component 2 is bonded to the center of the tray 12 on the side where the hemispherical protrusion 11 are not provided by silicone rubber. The flexible inverted cone component is made of flexible insulating materials such as silicone rubber or polydimethylsiloxane, preferably silicone rubber. The flexible inverted cone component is a circular cone or a polygonal pyramid with a multiple of four faces. The flexible inverted cone component 2 is preferably an inverted quadrangular pyramid.

The number of the flexible triangular excitation electrodes is 4N, and N is a positive integer. When the flexible inverted cone component 2 is a circular cone, the flexible triangular excitation electrode 3 has a curved fan shape and is attached to the outer surface of the flexible inverted cone component 2. When the flexible inverted cone component 2 is a multi-faceted pyramid, the flexible triangle excitation electrode 3 is a triangle. Each side of the flexible inverted cone component of the polyhedral pyramid is provided with a flexible triangular excitation electrode. Preferably, there are four flexible triangular excitation electrodes 3, which are evenly spaced on the four outer sides of the flexible inverted pyramid component 2 of the inverted quadrangular pyramid, and tangential force can be measured in four directions. When the flexible inverted cone component is an 8-sided pyramid, and 8 flexible triangular excitation electrodes 3 are arranged, the tangential force in 8 directions can be measured.

Each flexible triangular excitation electrode 3 is connected with a wire used as an excitation terminal. The material of the flexible triangular excitation electrode 3 is flexible conductive material such as silicone conductive silver glue, conductive polymer or conductive composite material, preferably silicone conductive silver glue. The outer surface of the flexible triangular excitation electrode 3 is provided with a silicone rubber layer, such as GD401, GD402 and other common room temperature vulcanized rubbers. The silicone rubber layer plays the roles of bonding the flexible triangular excitation electrode 3 on the surface of the flexible inverted cone component 2 and insulating. Compared with the rectangular excitation electrode, the flexible triangular excitation electrode 3 with a triangular shape has a larger change of the facing area of the two plates of the capacitor under the same normal force, so the capacitance changes more obviously with the external force.

Figure 7:
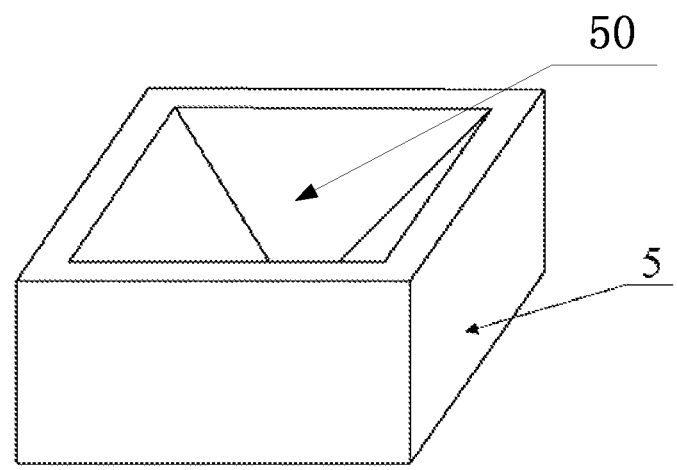
FIG. 7 is a schematic view of the structure of the flexible substrate.

Referring to FIG. 7, the flexible substrate 5 is a rectangular parallelepiped, and the material of the flexible substrate is made of flexible insulating materials such as silicone rubber or polydimethylsiloxane, preferably silicone rubber. The size of the flexible substrate 5 can support the tray 12. Preferably, the length and width of the flexible substrate 5 are consistent with the length and width of the tray 12. A second cavity 50 with an opening is opened inside the flexible substrate 5, and the shape of the second cavity 50 is consistent with the shape of the flexible common electrode 4, preferably an inverted quadrangular pyramid. An outer edge is formed around the opening of the second cavity 50. The size of the second cavity 50 of the flexible substrate 5 is the size of the flexible inverted cone component 2 enlarged by 1.5 times in proportion. The length and width of the opening of the second cavity 50 are smaller than the length and width of the rectangular parallelepiped on the outer surface of the flexible substrate 5.

Figure 6:
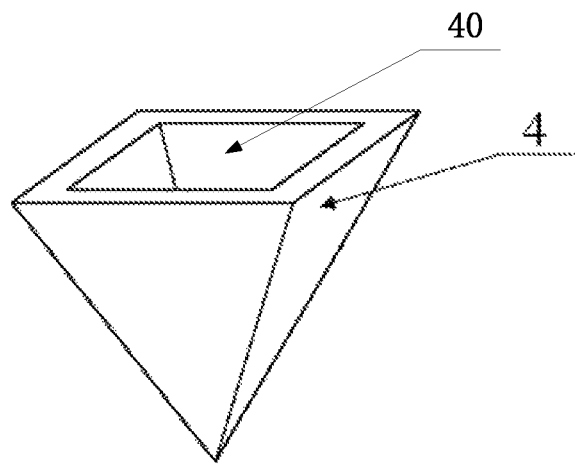
FIG. 6 is a schematic view of the structure of the flexible common electrode.

Referring to FIG. 6, the shape of the flexible common electrode 4 is preferably an inverted quadrangular pyramid, and the material of the flexible common electrode 4 is a flexible conductive material such as silicone conductive silver glue, conductive polymer, or conductive composite material, preferably silicone conductive silver glue. The height of the flexible common electrode 4 is smaller than the height of the second cavity 50 of the flexible substrate 5. The flexible common electrode 4 is connected with a wire connected to the ground and used as a common electrode. The outer surface of the flexible common electrode 4 is bonded to each inner wall of the second cavity 50 of the flexible substrate 5 by using silicone rubber as an adhesive. The second cavity 50 of the flexible substrate 5 is completely fitted and connected to the outer surface of the flexible common electrode 4.

The flexible common electrode 4 is provided with a first cavity 40 for placing the combined assembly of part of the flexible inverted cone component 2 and the flexible triangular excitation electrodes 3. The shape of the first cavity 40 is consistent with the shape of the flexible inverted cone component 2, preferably an inverted quadrangular pyramid. The first cavity 40 of the flexible common electrode 4 is an open cavity. Part of the flexible triangular excitation electrode 3 and the flexible inverted cone component 2 are placed in the first cavity to form a structure in which the flexible common electrode 4 does not completely surround the flexible triangular excitation electrode 3 and the flexible inverted cone component 2. The incompletely enclosed structural design enables the facing area of the electrode plate to be changed under the action of the normal force, so that the sensitivity of the present application can be improved. The flexible triangular excitation electrode 3 and the flexible inverted cone component 2 have no contact with the inner wall of the inverted quadrangular pyramid cavity of the flexible common electrode 4, and there is an air-filled cavity between them. Air can also be replaced with a common conductive flexible material, which also changes the medium between the plates, so that the dielectric constant between the plates will also change when the force is applied. However, due to the small resistance of air, the air cavity structure can obtain a larger deformation amount compared with other solid fillings under the same force, which is helpful to improve the sensitivity.

The structure composed of the flexible substrate 5 and the flexible common electrode 4 and the structure composed of the flexible inverted cone component 2 and the flexible triangular excitation electrode 3 form a plurality of spatially distributed capacitors. According to the change law of the four capacitance values when the normal force and the tangential force act on the hemispherical contact 1, the real-time perception of the direction and magnitude of the three-dimensional force is realized. The present application senses the direction and magnitude of the external force received by the hemispherical contact 1 through the change of multiple capacitance values, records the time-varying information of the external force, and provides fast and accurate feedback for the intelligent control terminal.

The embodiment of the present application proposes a method for preparing the high-sensitivity flexible three-dimensional force tactile sensor as described above, including the following steps:

using 3D printing technology and fluid forming technology, and using the multi-physics simulation software COMSOL to model and design the molds for each component, to print out a flexible substrate mold, a flexible inverted cone component mold;

injecting silicone rubber material into the flexible substrate mold, the flexible inverted cone component mold, and the hemispherical contact mold, mixing the silicone conductive silver glue with the curing agent and injecting into the flexible common electrode mold, putting all the molds in a vacuum drying oven to cure at room temperature, keep the temperature at 60° C., and release the molds after 2 to 3 hours of curing to obtain a flexible base, a hemispherical contact, a flexible inverted cone component, and a flexible common electrode;

spreading organic silicon conductive silver glue evenly on the center of the four side surfaces of the made flexible inverted cone component, forming a flexible triangle excitation electrode after standing and curing at room temperature, and spreading silicone rubber on the surface of the flexible triangle excitation electrode of the organic silicon conductive silver glue for insulation treatment; and using silicone rubber as an adhesive to assemble the obtained parts, bonding the flexible common electrode to the flexible substrate, bonding the flexible inverted cone component to the hemispherical contact, and bonding the hemispherical contact to the flexible substrate, to obtain the sensor of the present application.

The high-sensitivity flexible three-dimensional force tactile sensor of the present application works as follows:

The sensor uses a flexible triangular excitation electrode and a flexible common electrode to form four spatially distributed capacitors. When the normal force and tangential force act on the hemispherical contact 1, the distance between the plates and the effective facing area will be changed at the same time, thereby realizing the change of the capacitance value. Under the action of the normal force, the flexible triangular excitation electrode 3 is compressed downward, the distance between the flexible triangular excitation electrode 3 and the flexible common electrode 4 is reduced, and at the same time, the effective area of the electrode plates increases, and the multiple capacitance values increase in the same trend. Under the action of the tangential force, the flexible triangular excitation electrode 3 approaches the common end which is closer to the force-bearing direction, the distance between the two electrode plates decreases, the effective area increases, and the corresponding capacitance value increases. On the contrary, when the flexible triangular excitation electrode 3 is far away from the common end of the force-bearing direction, the corresponding capacitance value decreases accordingly. Through the measurement of multiple sets of experiments, a set of capacitance values under a specified external force can be calibrated, so that in practical applications, the magnitude and direction of the corresponding external force can be inverted through the capacitance value.

It will be apparent to those skilled in the art that, the present application is not limited to the details of the above-described exemplary embodiments, but that the present application may be implemented in other specific forms without departing from the spirit or essential characteristics of the present application. Accordingly, the embodiments are to be regarded in all respects as illustrative and not restrictive. The scope of the application is defined by the appended claims, rather than the foregoing description, and all changes that come within the meaning and range of equivalency of the claims are therefore intended to be embraced therein. Any reference signs in the claims shall not be construed as limiting the involved claim.

In addition, it should be understood that, although this specification is described in terms of embodiments, not each embodiment only includes an independent technical solution, and this description in the specification is only for the sake of clarity. Those skilled in the art should take the description as a whole, and the technical solutions in each embodiment can also be appropriately combined to form other embodiments that can be understood by those skilled in the art.

What is claimed is:

1. A high-sensitivity flexible three-dimensional force tactile sensor, includes:
    a hemispherical contact, wherein the hemispherical contact includes a tray with a groove on the surface and a hemispherical protrusion arranged in the groove;

a flexible inverted cone component connected to the lower surface of the hemispherical contact, wherein a plurality of flexible triangular excitation electrodes are arranged on the side surface of the flexible inverted cone component; and a flexible common electrode surrounding part of the flexible triangular excitation electrodes, wherein a first cavity with an opening is opened inside the flexible common electrode, the shape of the first cavity is consistent with the shape of the flexible inverted cone component, the flexible triangular excitation electrodes and a part of the flexible inverted cone component are arranged in the first cavity of the flexible common electrode, and each of the flexible triangular excitation electrodes and the flexible inverted cone component have no contact with the inner wall of the first cavity of the flexible common electrode to form an air cavity.

2. The high-sensitivity flexible three-dimensional force tactile sensor according to claim 1, wherein, further comprising:

a flexible substrate connected to the outer surface of the flexible common electrode for supporting the flexible common electrode and the hemispherical contact.

3. The high-sensitivity flexible three-dimensional force tactile sensor according to claim 2, wherein, a second cavity with an opening is opened inside the flexible substrate; the shape of the second cavity is consistent with the shape of the flexible common electrode; the flexible common electrode is fitted on the inner wall of the second cavity of the flexible substrate; the outer edge of the top surface of the second cavity of the flexible substrate and the outer edge of the bottom surface of the tray are bonded by silicone rubber bonding.

4. The high-sensitivity flexible three-dimensional force tactile sensor according to claim 2, wherein, the flexible substrate is a rectangular parallelepiped, and the length and width of the flexible substrate are consistent with the length and width of the tray.

5. The high-sensitivity flexible three-dimensional force tactile sensor according to claim 2, wherein, the height of the flexible common electrode is smaller than the height of the second cavity of the flexible substrate, the flexible common electrode is connected with a wire connected to the ground and used as a common electrode, each side surface of the flexible common electrode is bonded to each inner side surface of the second cavity of the flexible substrate by using silicone rubber as an adhesive.

6. The high-sensitivity flexible three-dimensional force tactile sensor according to claim 1, wherein, the size of the flexible inverted cone component is smaller than the size of the first cavity of the flexible common electrode, and the flexible inverted cone component is bonded to the center of the tray on the side where the hemispherical protrusion is not provided by silicone rubber.

7. The high-sensitivity flexible three-dimensional force tactile sensor according to claim 1, wherein, the number of the flexible triangular excitation electrodes is 4N, and N is a positive integer;

when the flexible inverted cone component is a circular cone, the flexible triangular excitation electrode has a curved fan shape and is attached to the outer surface of the flexible inverted cone component; when the flexible inverted cone component is a multi-faceted pyramid, the flexible triangle excitation electrode is a triangle;

each side of the flexible inverted cone component of the polyhedral pyramid is provided with a flexible triangular excitation electrode, the outer surface of the flexible triangular excitation electrode is provided with a silicone rubber layer, and each flexible triangular excitation electrode is connected with a wire used as an excitation terminal.

8. The high-sensitivity flexible three-dimensional force tactile sensor according to claim 2, wherein, the materials used for the hemispherical contacts, the flexible substrate, and the flexible inverted cone component are silicone rubber or polydimethylsiloxane, and the materials used for the flexible common electrode and the flexible triangular excitation electrode is silicone conductive silver glue, conductive polymer, or conductive composite material.

9. The high-sensitivity flexible three-dimensional force tactile sensor according to claim 1, wherein, the shapes of the flexible inverted cone component and the flexible common electrode are inverted quadrangular pyramid.

10. A method for preparing a high-sensitivity flexible three-dimensional force tactile sensor, including the following steps:

using 3D printing technology to print out a flexible substrate mold, a flexible inverted cone component mold, a flexible common electrode mold and a hemispherical contact mold;

injecting silicone rubber material or polydimethylsiloxane into the flexible substrate mold, the flexible inverted cone component mold, and the hemispherical contact mold, injecting organic silicon conductive silver glue, conductive polymer, or conductive composite material into the flexible common electrode mold, releasing from the molds after cured, and a flexible substrate, a hemispherical contact, a flexible inverted cone component and a flexible common electrode prepared;

spreading organic silicon conductive silver glue, conductive polymer, or conductive composite material evenly on the center of the side surface of the made flexible inverted cone component, a flexible triangle excitation electrode formed after standing and curing, and spreading silicone rubber on the surface of the flexible triangle excitation electrode; and using silicone rubber as an adhesive to assemble the obtained parts.

* * * * *